US007962911B2

(12) United States Patent
Cheng et al.

(10) Patent No.: US 7,962,911 B2
(45) Date of Patent: Jun. 14, 2011

(54) METHOD AND APPARATUS FOR PREVENTING UNDESIRED TERMINATION OF A PROCESS IN AN INFORMATION HANDLING SYSTEM

(75) Inventors: Yinhe Cheng, Austin, TX (US); Hsian-Fen Tsao, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 1168 days.

(21) Appl. No.: 11/670,572

(22) Filed: Feb. 2, 2007

(65) Prior Publication Data
US 2008/0189708 A1    Aug. 7, 2008

(51) Int. Cl.
*G06F 9/46* (2006.01)
(52) U.S. Cl. .................... 718/100; 718/102
(58) Field of Classification Search ............ 718/100, 718/102, 103; 709/228
See application file for complete search history.

(56) References Cited

U.S. PATENT DOCUMENTS

| 6,741,553 | B1 | 5/2004 | Grenier |
| 6,986,141 | B1 * | 1/2006 | Diepstraten et al. ......... 718/108 |
| 2003/0072435 | A1 | 4/2003 | Lee |
| 2005/0132375 | A1 * | 6/2005 | Douceur et al. ............ 718/100 |

OTHER PUBLICATIONS

NOHUP—Nohup-LQWWiki—LinuxQuestions.org (downloaded Dec. 8, 2006).
SIGHUP—SIGHUP—Answers.com (downloaded Jan. 27, 2007).
ISRWO—International Search Report and Written Opinion (May 14, 2008).
SASSE—XP002475372 "nohup—g and ruby-1.6.7 on Solaris9" (Aug. 22, 2002).
SUN—XP002475373 "Run a command immune to hangups" (Dec. 2002).
IYACP—XP002475374 "Sending a running process to the background" (Jun. 2006).
LEVENTHAL—XP002475375 "Inside nohup—p" (Jul. 9, 2004).

* cited by examiner

*Primary Examiner* — Meng-Ai An
*Assistant Examiner* — Caroline Arcos
(74) *Attorney, Agent, or Firm* — Matt Talpis; Mark P Kahler

(57) ABSTRACT

An information handling system (IHS) employs operating system software to manage IHS resources. The operating system software manages software application programs as processes executing within the IHS. The processes run in foreground and background mode within the IHS. Processes running in foreground mode are subject to hang-up events with negative process output results, such as output data loss. In one embodiment, the operating system software supports a "no hang-up now" command for use with processes running in foreground mode. The "no hang-up now" command provides system users the ability to hang-up or log-out of an IHS terminal without negative effects on the current foreground process. A user may invoke the "no hang-up now" command after execution of the foreground process is already underway. The no hang-up command moves the foreground application to the background for continued execution. A signal handler program prevents termination of the background process until the process completes.

20 Claims, 3 Drawing Sheets

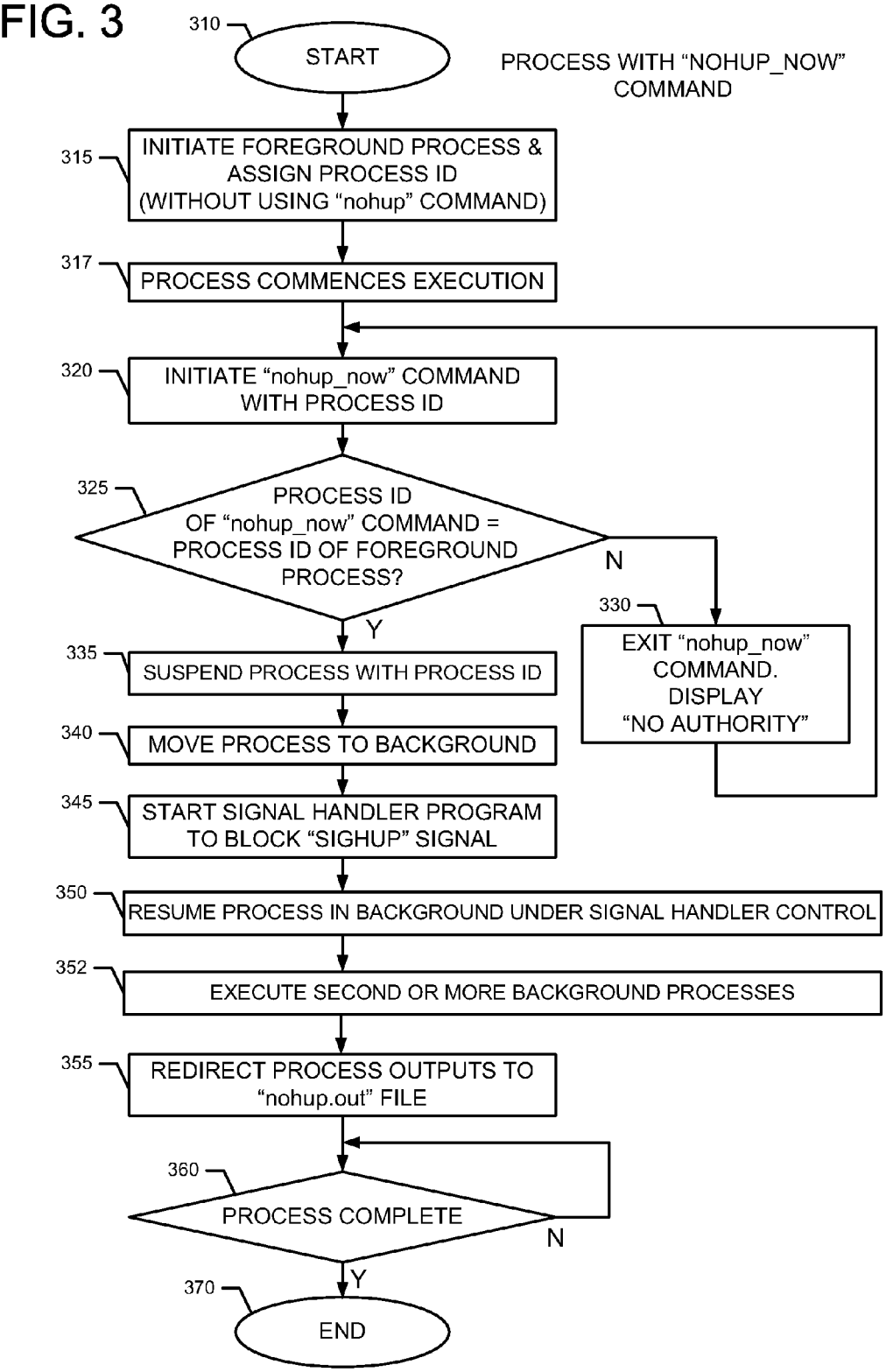

METHOD AND APPARATUS FOR PREVENTING UNDESIRED TERMINATION OF A PROCESS IN AN INFORMATION HANDLING SYSTEM

TECHNICAL FIELD OF THE INVENTION

The disclosures herein relate generally to information handling systems (IHSs), and more particularly, to avoiding the undesired termination of processes in information handling systems.

BACKGROUND

An information handling system (IHS) may include multiple processors or processor cores for processing, handling, communicating or otherwise manipulating information. A multitasking IHS is an IHS with an operating system (OS) that executes multiple processes simultaneously. The processor(s), processor cores and operating system (OS) cooperate to provide a multitasking IHS environment that manages several individual software application programs and their attendant processes. Some software applications or processes in such applications may require extensive IHS resources and consequently take a long time to execute. For example, some software processes require several minutes, hours or even days to execute in some cases. Processes that require extensive IHS resources and time may run more efficiently if the OS allows the process software to run without an IHS user's attention. The user then retrieves the process data results at a later time when the software process completes.

System users, including programmers and other IHS users, initiate processes to run within the IHS. Processes, namely portions of software applications, may execute in foreground or background modes within the IHS under operating system (OS) control. In multitasking systems, one of many processes runs in the foreground as a foreground process, while one or more remaining processes run in the background as background processes. Foreground processes run interactively with the system user by accepting input from keyboard, mouse, or other input devices. Background processes run in the background typically without user intervention until completion. The OS typically directs the output of processes, such as process data results, running in foreground mode to a terminal or other output device for viewing or use by the system user. The OS associates foreground processes with a particular system user. In true multitasking IHS environments, multiple system users can log into the IHS at any given time. Thus, the OS may manage multiple foreground processes at the same time. Each process then running within the IHS, includes a respective process ID that associates the process with the particular system user who initiates the process.

Background processes typically have a lower priority than foreground processes. OS software sets the background process to the lower priority to ensure that no interference occurs with the higher priority interactive foreground processes. For example, some word processors may print files in the background, enabling the system user to continue editing a word processing document while files print. Typically this background process is known as "print spooling". Background processes run without the need for interactive control or user intervention. Background processes are suitable for processes that require significant processor time without the need for system user interaction. In background process tasks, results typically output to a processor system file in a storage device such as a hard drive, compact disk (CD), or other storage media that the system user can access at a later time.

The system user may initiate a process in the foreground and then desire to move the same process to the background at a later time. For example, the system user may need to initiate a new foreground process and let the current process continue running. Another reason to move the process from the foreground mode to the background mode is the situation where the process takes more time to complete than the system user originally expects. Thus the system user may wish to move to a new location or monitor the process at a later time.

System users who run processes in background mode can include an operating system (OS) level command such as the "nohup" (no hang-up) command when they initiate or begin the processing of a process or software program containing a process. The user may submit this OS command as a request at the time the program with the process initiates. This approach is particularly useful in instances where the user knows in advance that execution of the process will take a long time. System users may set the proper nohup OS command at the time of process initiation to prevent future actions such as "logging-out" from affecting the process. System users can return to the process for results when convenient at a later time. However, the nohup command typically requires the user to input the command when the process initiates.

What is needed is an apparatus and methodology that addresses the problems of executing software processes within a complex multitasking IHS with unpredictable process time constraints, namely those where the user does not know in advance how long execution of a software process will take.

SUMMARY

Accordingly, in one embodiment, a method is disclosed for processing information in an information handling system (IHS). The method includes loading, by an operating system in the IHS, a first process in a foreground mode, the first process having a respective process identifier associated therewith. The method also includes executing, by the operating system, the first process over time in the foreground mode. The method further includes receiving, by the operating system, a command. The method still further includes moving, by the operating system, the first process from the foreground mode to a background mode in response to the command. The method also includes ignoring, by the operating system, requests to terminate the first process until the first process completes. For example, in one embodiment, the operating system ignores hangup signals that would otherwise cause the first process to terminate before the first process completes.

In another embodiment, an information handling system (IHS) includes a processor and a memory that is coupled to the processor. The memory stores an operating system that executes processes, wherein the operating system loads a first process in a foreground mode, the first process having a respective process identifier associated therewith. The operating system executes the first process over time in the foreground mode. The operating system moves the first process from the foreground mode to a background mode in response to a command after which the operating system ignores requests to terminate the first process until the first process completes.

In yet another embodiment, a computer program product stored on a computer operable medium for controlling execution of processes in an information handling system is disclosed. The computer program product includes instructions for loading, by an operating system, a first process in a foreground mode, the first process having a respective process identifier associated therewith. The computer program product also includes instructions for executing, by the operating system, the first process over time in the foreground mode. The computer program product further includes instructions for receiving, by the operating system, a command. The computer program product still further includes instructions for moving, by the operating system, the first process from the foreground mode to a background mode in response to the command. The computer program product also includes instructions for ignoring, by the operating system, requests to terminate until the first process completes.

BRIEF DESCRIPTION OF THE DRAWINGS

The appended drawings illustrate only exemplary embodiments of the invention and therefore do not limit its scope because the inventive concepts lend themselves to other equally effective embodiments.

FIG. 3 is a flow chart that depicts the disclosed software application command methodology of FIG. 2.

DETAILED DESCRIPTION

Figure 1:
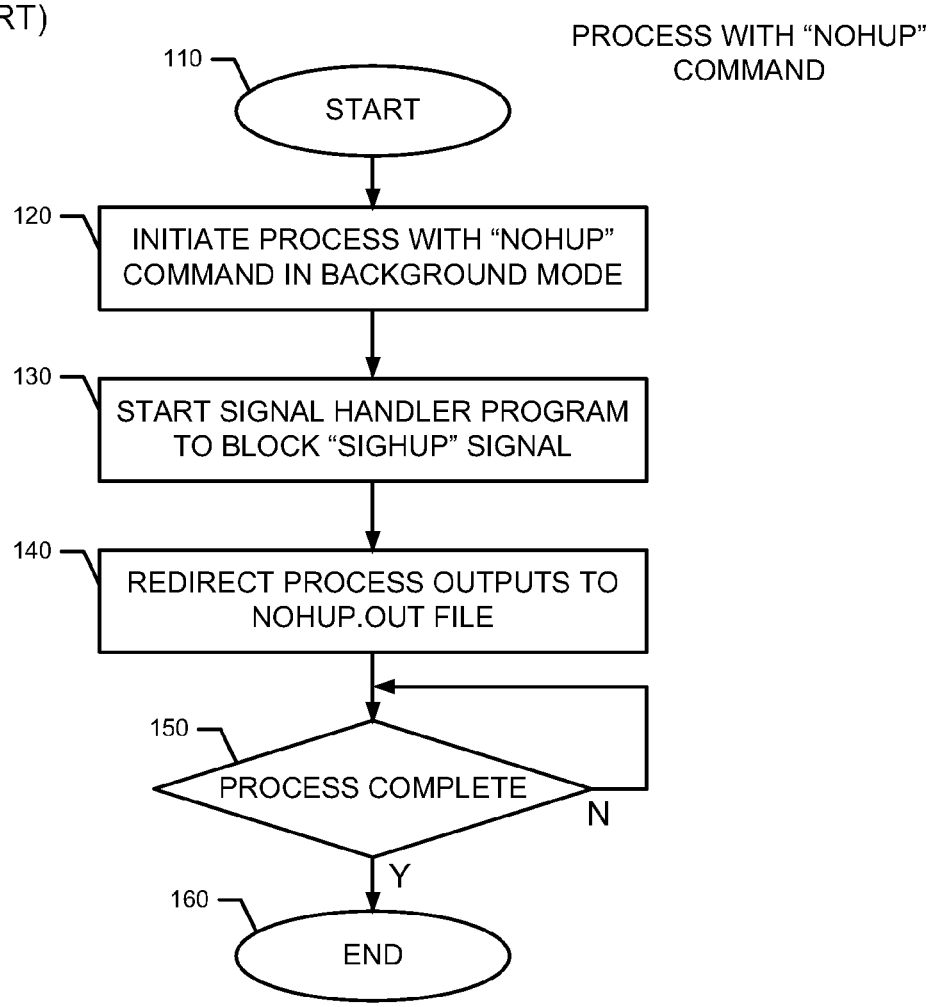
FIG. 1 is a flow chart that depicts a conventional software application command methodology.

Processes are sequences of code or software instructions that accomplish a particular purpose or function within the (IHS). Processes that take a long time to complete present a particular challenge to information handling system (IHS) users. One operating system (OS) command available to IHS users in this situation is the "nohup" command. At the time when a particular process initializes, the IHS user may invoke the "nohup" command such as shown in TABLE 1 below.

TABLE 1 nohup process [arg] &

The "nohup" or "no hang-up" operating system command provides an effective method of initiating a process in background mode and ignoring hang-up signals. The operating system effectively avoids termination of the process due to hang-up signals. The "nohup" term precedes the "process" that the system user desires to execute. The term "arg" or arguments provide further modification to the "nohup" command for that particular process. Argument values are a function of the operating system and vary from operating system to operating system. Many "nohup" command arguments are available dependent on the particular OS software and programming software environment currently executing on the IHS. The system user may input multiple argument elements in one "nohup" command entry. Those skilled in the art will appreciate the numerous arguments that the user may invoke with the conventional OS software level "nohup" command. The "&" term in TABLE 1 specifies the immediate move of the process to background mode.

In more detail, "nohup" is an operating system software command that a user may invoke from many different programming software languages. For example, "nohup" is a common command that Linux, UNIX, and other computer operating system languages support for use in servers, workstations and other IHSs. The "nohup" command is also programmable from the C programming language, the JAVA language (Java is a trademark of Sun Microsystems, Inc.), the hypertext pre-processor (PHP) language, and other computer software programming languages. One beneficial use of the "nohup" command by system users is to make any particular process immune to hang-ups or hang-up requests. Hang-ups include log-outs, terminal exits, disconnects, breaking of the login connection, or any method that terminates an executing foreground or background process that executes on an IHS. Without the use of the "nohup" command, when a system user or other entity causes such a hang-up event on the IHS, the process executing on the IHS typically terminates with unfavorable results such as data loss, data corruption, and other negative consequences.

In one example, the system user initiates a software process and then determines that the process is going to take longer than the system user initially expected. In this case, the system user may need to hang-up, log out, or otherwise disconnect from the IHS and return to the process at a later time. If the system user did not issue the "nohup" command when he or she initialized the process, the process will terminate and any data that the process generates during execution is lost. However, if the system user initiates the process along with the "nohup" command, the process will automatically execute in background mode, ignoring any hang-up signals and continue executing until the process normally completes or other system user action intervenes.

If the system user does not initiate a software process with a simultaneous "nohup" command, when a hang-up condition occurs the IHS detects the hang-up condition. In response to detecting the hang-up condition, the OS generates a "sighup" signal that corresponds to the system user responsible for the hang-up. The OS terminates any process that the system user responsible for the hang-up initiated. These user-initiated processes terminate in response to the sighup signal regardless of whether these processes execute in foreground or background mode. However, when the system user initiates a software process with the "nohup" command, hang-up conditions do not terminate that process. Another way of describing the "nohup" command is to consider that when the system user initiates the "nohup" command at the launch time of a process, the OS informs the process of the "nohup" command shown in TABLE 1. This action instructs the process to ignore the "sighup" signal, thus effectively ignoring any hang-up events.

FIG. 1 is a flowchart that represents an operation using the conventional "nohup" command in a software application. The command shown in TABLE 1 is "nohup process [arg] &". Process flow begins at start block 110. The IHS user initiates the process along with the "nohup" command, as per block 120. The operating system of the IHS then initiates the process in background mode and provides immunity from system user hang-up events for the particular process for which the user invoked the "nohup" command. For example, the system user may wish to log-out or log off of the IHS and yet still desires the particular process to continue running. The OS starts a signal handler program within the OS to block the "sighup" signal, thus effectively creating immunity to hang-ups for the particular process, as per block 130. Signal handler programs are individual programs operating under the control of the OS in the information handling system IHS. A signal handler program may continuously monitor for specific signals, in this instance a hang-up signal, and initiate specific software action in response to detection of the specific signal under OS control. The OS redirects process output data, such as information that would normally output to a terminal in foreground mode, to an output file "nohup.out", as per block 140. The process continues to run in background mode until complete. If the process is not complete, a process complete test returns a false result, as per test block 150, and flow returns to test block 150 again. When the process is complete, as seen by test block 150 returning a true result, operation of the particular process ends, as per end block 160.

Although the "nohup" command can affect the current process during the hang-up event, the system user must explicitly call for the "nohup" command at the time of initiation or launch of the particular process. In fact, without setting the "nohup" command along with the initiation of the particular process, the process is not immune to hang-ups. Without the "nohup" command, the system user may need to terminate the process and restart at a later time. Shutting down a running process may cause the loss of data, and negate any effective value that the background mode of the IHS can provide.

One method of providing the effectiveness of the "nohup" command on already initiated and running processes without the need to halt and restart the process is to issue the "nohup_now" command disclosed herein. The "nohup_now" command, as shown below in TABLE 2 of the disclosed methodology, is available to a modified OS running within the IHS. The "nohup_now" command is available to system users to support the management of processes running in foreground mode within the IHS.

TABLE 2 nohup_now process ID &

The term "nohup_now" provides a short hand name for an OS software command "no hang up now". The term "process ID" in TABLE 2 corresponds to the identifier or ID of the process running in foreground for which the system user desires to provide immunity from hang-ups. The "&" term in TABLE 2 specifies the immediate move of the process with process ID to background mode. Once the process with process ID moves to background mode, the OS interprets "sighup" signals as with the conventional "nohup" command.

Figure 2:
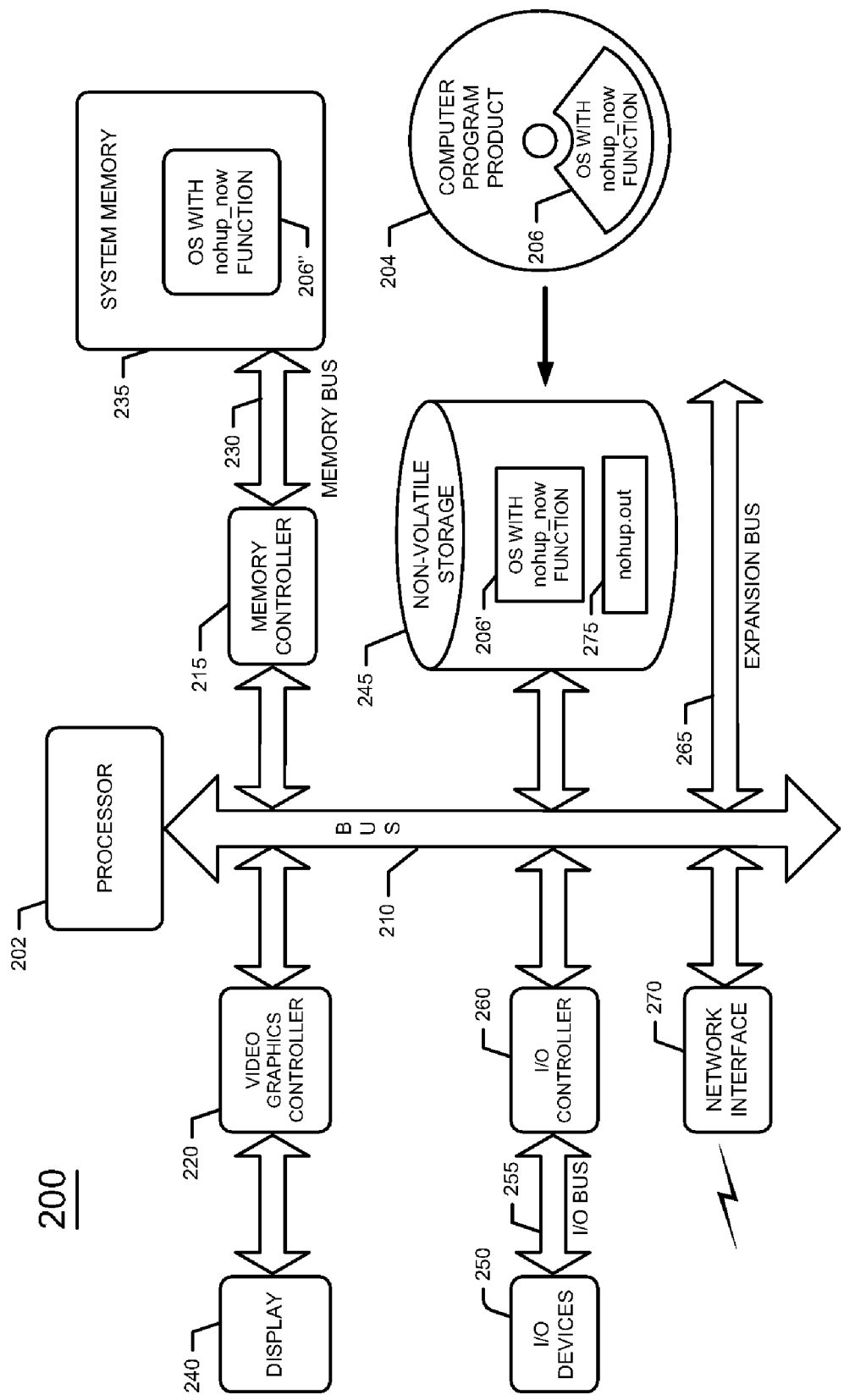
FIG. 2 is a block diagram of an information handling system employing the disclosed software application command methodology.

FIG. 2 shows a simplified block diagram of a representative information handling system (IHS) 200 that employs the disclosed "no hang up now" methodology and apparatus. IHS 200 includes a processor 202. In one embodiment, information handling system (IHS) 200 includes a computer program product 204 that includes an operating system (OS) 206 with the "now hang up now" or "nohup_now" functionality as described herein. Computer program product 204 may be in the form of a disk, cartridge or other movable storage media.

IHS 200 further includes a bus 210 that couples processor 202 to memory controller 215 and video graphics controller 220. System memory bus 230 couples memory controller 215 to system memory 235 as shown. In some applications, processor 215 may include an integrated memory controller 215. In actual practice, bus 210 may include multiple buses, for example a memory bus and an I/O bus. A display 240 couples to video graphics controller 220. Non-volatile storage 245, such as a hard disk drive, compact disk CD drive, DVD drive, or other non-volatile storage couples to bus 210 to provide IHS 200 with permanent storage of information. File information that background processes generate as output information, write to a nohup.out file 248 as part of non-volatile storage 245. I/O devices 250, such as a keyboard and a mouse pointing device, couple via I/O bus 255 and I/O controller 260 to bus 210. One or more expansion busses 265, such as USB, IEEE 1394 bus, ATA, SATA, PCI, PCIE and other busses, couple to bus 210 to facilitate the connection of peripherals and devices to IHS 200. A network interface adapter 270, couples to bus 210 to enable IHS 200 to connect by wire or wirelessly to a network and other information handling systems.

In one embodiment, computer program product 204 is a disk or other storage medium that includes an operating system 206 with the disclosed "no hang up now" or "nohup_now" command functionality. Computer program product 204 is a CD, DVD, other media disk, media drive, cartridge or other storage medium. A user or other entity supplies computer program product 204 to non-volatile storage 245 for storage therein. In this manner, non-volatile storage 245 stores the operating system with nohup_now functionality as OS 206'. Non-volatile storage 245 includes a storage location "nohup.out" 275 that stores the result or results of the particular process. When IHS 200 initializes or boots up, the OS containing the "nohup_now" command software loads into system memory 235 as OS 206" for use by IHS 200. In this manner, the "nohup_now" command is available for use by system users, programmers and other entities.

While FIG. 2 shows one IHS that employs the "nohup_now" methodology as IHS 200, IHS 200 may take many forms. For example, IHS 200 may take the form of a desktop, server, portable, laptop, notebook, or other form factor computer or data processing system. IHS 200 may also take other form factors such as a gaming device, a personal digital assistant (PDA), a portable telephone device, a communication device or other devices that include processor and memory.

FIG. 3 is a flowchart that depicts process flow in an operating system including the disclosed "no hang up now" methodology as carried out by IHS 200 in one embodiment. The software application command shown in TABLE 2 above as "nohup_now process ID &" is one of multiple software application commands available to users of IHS 200. Operational flow begins at start block 310. The operating system may run or execute several processes in IHS 200. Whenever the OS loads and executes a process, the OS assigns that process a respective unique process identifier, namely a process ID. The system user initiates a process with a process ID without using the "nohup" command described above, as per block 315. This particular process is a foreground process. The particular process may be virtually any software process that the OS may execute. Examples of processes that the OS may execute include 1) receiving a long stream of data, 2) manipulating graphics display data, and 3) executing data intensive calculation processes. The process with process ID commences execution under the OS, as per block 317. At a later point in time, namely after the particular process commences execution, the system user may determine that the particular process with process ID would benefit from immunity to hang-ups. For example, the system user may wish to log-out of the IHS 200 and yet still desire the particular process with process ID to continue running. In another example, the system user may initiate the particular process with process ID in the workplace and run out of time waiting for the process results or process to complete. The system user may wish to come back at a later time to view the results of the time intensive particular process. Some examples of time intensive processes include benchmarking processes, compiling processes, and other time intensive processes of software application programs.

The system user inputs the "nohup_now" command such as the example in Table 2, namely "nohup_now process ID &", as per block 320. In one embodiment, the user inputs or otherwise provides the IHS with the "nohup_now" command some amount of time after initiating the particular process.

The system user inputs the "nohup_now" command interactively while the particular process runs in the foreground mode and other processes run in the background mode within IHS 200. The OS software 206" receives as input, the "nohup_now" command and tests to verify that the "nohup_now" command contains the same process ID as the current particular process running in foreground mode within IHS 200 by the same system user, as per the process ID test block 325. If the test of block 325 determines no match between the process ID of the system user's current foreground processes and the process ID of the same system user's "nohup_now" command, then in response the OS issues a "NO AUTHORITY" message to the system user, and the "nohup_now" command exits, as per block 330. The system user may then initiate another "nohup_now" command with process ID and flow continues again with block 320. However, if test block 325 confirms that the process ID of the current foreground process and the process ID of the "nohup_now" command match, then the OS software 206" suspends the foreground process with process ID, as per block 335. When the OS suspends the process with process ID, the OS moves the same foreground process with process ID to the background under OS 206" control, as per block 340. With this particular process now resident in the background of IHS 200, OS software 206" maintains the process priority amongst all background processes currently executing or running. The OS 206" typically generates process priorities among competing processes in regard to the most efficient use of IHS 200 resources. However, system users may force priority settings per process by direct commands setting process priority by process ID. Without further action by OS software 308, the process with process ID would be subject to hang-up events.

To provide immunity to hang-up events, OS software 206" starts the signal handler program to block the "sighup" hang-up request signal described above, as per block 345. The signal handler program is part of OS 206". Once the signal handler program is running, OS software 206" resumes the particular process in background mode under signal handler control, as per block 350. While the particular process executes under signal handler control, OS software 206" intercepts events such as hang-ups or hang-up requests, and any other system user disconnects. As block 352 indicates, the OS software 206" may execute a second background process, or many other background processes, as well as the particular process. OS software 206" redirects process output data from the particular process, such as information that would normally output to a terminal in foreground mode to the output file "nohup.out" 275, as per block 355. The system user can explicitly assign a file name other than nohup.out if desired. The particular process with process ID continues to run in background mode. If the process with process ID is not complete, a process complete test returns a false result, as per test block 360, and flow returns to test block 360. When the process with process ID is complete, test block 360 returns a true result and the operation ends, as per end block 370. Although the example above shows one system user initiating the particular process with process ID, other IHS 200 sources such as automatic process schedulers, batch files, and other process initiators may initiate processes utilizing the disclosed methodology.

Those skilled in the art will appreciate that the various structures disclosed can be implemented in hardware or software. Moreover, the methodology represented by the blocks of the flowchart of FIG. 3 may be embodied in a computer program product, such as a media disk, media drive or other media storage such as computer program product medium 204 of FIG. 2.

In one embodiment, the disclosed methodology is implemented as a client application, namely a set of instructions (program code) in a code module which may, for example, be resident in system memory 235 of IHS 200 of FIG. 2. Until required by IHS 200, the set of instructions may be stored in another memory, for example, non-volatile storage 245 such as a hard disk drive, or in a removable memory such as an optical disk or floppy disk, or downloaded via the Internet or other computer network. Thus, the disclosed methodology may be implemented in a computer program product for use in a computer such as IHS 200. It is noted that in such a software embodiment, code which carries out the functions depicted in the FIG. 3 flow chart may be stored in system memory 235 while such code is being executed. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

The foregoing discloses an information handling system that employs an operating system (OS) software methodology to provide no hang-up command level software code to effect processes that system users initiate in foreground mode. In one embodiment, the disclosed method includes applying the no hang-up command to a process running in foreground mode, thus providing immunity of the process to any future hang-up events. In one embodiment, the no hang-up command provides additional functionality to the conventional "nohup" command in use by operating system software within IHS systems.

Modifications and alternative embodiments of this invention will be apparent to those skilled in the art in view of this description of the invention. Accordingly, this description teaches those skilled in the art the manner of carrying out the invention and is intended to be construed as illustrative only. The forms of the invention shown and described constitute the present embodiments. Persons skilled in the art may make various changes in the shape, size and arrangement of parts. For example, persons skilled in the art may substitute equivalent elements for the elements illustrated and described here. Moreover, persons skilled in the art after having the benefit of this description of the invention may use certain features of the invention independently of the use of other features, without departing from the scope of the invention.

What is claimed is:

1. A method of processing information in an information handling system (IHS), comprising:
   loading, by an operating system in the IHS, a first process in a foreground mode, the first process having a respective process identifier associated therewith;
   executing, by the operating system, the first process over time in the foreground mode;
   receiving, by the operating system, a no hang-up now user command directed to the first process that is executing in the foreground mode, the no hang-up user command instructing the operating system to both move the first process from the foreground mode to a background mode and to block subsequent hang-up requests directed to the first process;
   moving, by the operating system, the first process from the foreground mode to the background mode in response to the no hang-up now user command;
   intercepting in response to the no hang-up now user command, by the operating system, a hang-up request directed to the first process, thus providing an intercepted hang-up request; and blocking, by the operating system, the intercepted hang-up request from terminating the first process until the first process completes.

2. The method of claim 1, wherein the no hang-up now user command includes a process identifier.

3. The method of claim 2, further comprising testing, by the operating system, to determine if the process identifier of the no hang-up now user command matches the process identifier of the first process, and in response to a match the operating system moves the first process from the foreground mode to the background mode.

4. The method of claim 3, wherein in response to the match the operating system suspends the first process in the foreground mode prior to moving the first process to the background mode.

5. The method of claim 3, further comprising executing a signal handler program, by the operating system, to block hang-up requests when the first process is in the background mode.

6. The method of claim 1, wherein the operating system continues execution of the first process in the background mode after moving the first process from the foreground mode to a background mode in response to the no hang-up now user command.

7. The method of claim 6, wherein the first process produces results that the operating system stores in an output file while the first process executes in the background mode.

8. The method of claim 1, further comprising executing, by the operating system, a second process in the background mode along with the first process.

9. An information handling system (IHS) comprising:
a processor; and
a memory, coupled to the processor, that stores an operating system that executes processes, wherein the operating system loads a first process in a foreground mode, the first process having a respective process identifier associated therewith, the operating system executing the first process over time in the foreground mode, the operating system receiving a no hang-up now user command directed to the first process while the first process is executing in the foreground mode, the no hang-up user command instructing the operating system to both move the first process from the foreground mode to a background mode and to block subsequent hang-up requests directed to the first process, the operating system moving the first process from the foreground mode to the background mode in response to the no hang-up now user command, the operating system intercepting in response to the no hang-up now user command a hang-up request directed to the first process, thus providing an intercepted hang-up request, the operating system blocking the intercepted hang-up request from terminating the first process until the first process completes.

10. The IHS of claim 9, wherein the no hang-up now user command includes a process identifier and the operating system tests to determine if the process identifier of the no hang-up now user command matches the process identifier of the first process, and in response to a match the operating system moves the first process from the foreground mode to the background mode.

11. The IHS of claim 10, wherein in response to the match the operating system suspends the first process in the foreground mode prior to moving the first process to the background mode.

12. The IHS of claim 10, wherein the operating system includes a signal handler program that blocks hang-up requests when the first process is in the background mode.

13. The IHS of claim 9, wherein the operating system is configured to continue execution of the first process in the background mode after moving the first process from the foreground mode to the background mode.

14. The IHS of claim 13, wherein the operating system is configured to store results that the first process produces in an output file while the first process executes in the background mode.

15. The IHS of claim 14, wherein the operating system is configured to execute a second process in the background mode along with the first process.

16. A computer program product, comprising:
a non-transitory computer readable storage device for use on an information handling system;
first instructions for loading, by an operating system, a first process in a foreground mode, the first process having a respective process identifier associated therewith;
second instructions for executing, by the operating system, the first process over time in the foreground mode;
third instructions for receiving, by the operating system, a no hang-up now user command directed to the first process while the first process is executing in the foreground mode, the no hang-up user command instructing the operating system to both move the first process from the foreground mode to a background mode and to block subsequent hang-up requests directed to the first process;
fourth instructions for moving, by the operating system, the first process from the foreground mode to the background mode in response to the no hang-up now user command;
fifth instructions for intercepting in response to the no hang-up now user command, by the operating system, a hang-up request directed to the first process, thus providing an intercepted hang-up request; and
sixth instructions for blocking, by the operating system, the intercepted hang-up request from terminating the first process until the first process completes;
wherein the first, second, third, fourth, fifth and sixth instructions are stored on the non-transitory computer readable storage device.

17. The computer program product of claim 16, wherein the no hang-up now user command includes a process identifier, the computer program product further comprising:
seventh instructions for testing, by the operating system, to determine if the process identifier of the no hang-up now user command matches the process identifier of the first process, and in response to a match the operating system moves the first process from the foreground mode to the background mode.

18. The computer program product of claim 17, further comprising eighth instructions for suspending, by the operating system in response to the match, the first process in the foreground mode prior to moving the first process to the background mode.

19. The computer program product of claim 17, further comprising ninth instructions for executing a signal handler program, by the operating system, to block hang-up requests when the first process is in the background mode.

20. The computer program product of claim 17, wherein the first process produces results, the computer program product further comprising tenth instructions for storing the results in an output file while the first process is in the background mode.

* * * * *